United States Patent
Goodhill et al.

[19]

[11] Patent Number: 5,946,076
[45] Date of Patent: Aug. 31, 1999

[54] SWITCHABLE PULLDOWN FILM PROJECTION SYSTEM

[75] Inventors: Dean K. Goodhill; Don P. Behrns, both of Los Angeles, Calif.

[73] Assignee: MaxiVision Cinema Technology, Los Angeles, Calif.

[21] Appl. No.: 08/598,033

[22] Filed: Feb. 7, 1996

[51] Int. Cl.$^6$ .................................................. G03B 21/48
[52] U.S. Cl. .......................................... 352/180; 352/187
[58] Field of Search .................................. 352/168, 180, 352/187; 396/210

[56] References Cited

U.S. PATENT DOCUMENTS

| | | |
|---|---|---|
| 1,318,610 | 10/1919 | Sereinsky . |
| 1,835,743 | 12/1931 | Aster . |
| 1,921,494 | 8/1933 | Wildhaber . |
| 1,999,754 | 4/1935 | Evans . |
| 2,079,572 | 5/1937 | Kiel . |
| 3,285,087 | 11/1966 | Wells . |
| 3,565,521 | 2/1971 | Butler et al. ............................. 352/163 |
| 3,741,636 | 6/1973 | Nakayama ............................... 352/180 |

(List continued on next page.)

FOREIGN PATENT DOCUMENTS

93/12456  6/1993  WIPO .

OTHER PUBLICATIONS

"Too Costly for Prime Time", *L.A. Times* (Mar. 22, 1992).
"Editing a Whirlwind for 'Christmas'", *Daily Variety Special Report* (Mar. 16, 1992).
"Electronic Editing with Dean Goodhill", *Editors Guild Newsletter* (Winter 1992).
"You Want a Whole Movie by When?", *Calendar* (undated).
"New Clairmont Super 1.85: 32% More Image Area . . . ", advertisement (undated).
"Three–Perf Technology: Tomorrow's Film Format—Today", *International Photographer* (Oct. 1987).
"Step Printers", Optical Printers, etc. (circa 1950).
"Film Pulldown Mechanism Based on a Design by Samuel B. Grimson", *SMPTE* vol. 67.
"The Radial–Tooth, Variable–Pitch Sprocket", *SMPTE* vol. 57.
Edmund M. Digiulio, SMPTE Study Group on 30–Frame Film Rate: Final committee Report on the Feasibility of Motion–Picture Frame–Rate Modication to 30 Frames/sec, SMPTE Journal, pp. 404–408, May 1988.
SMPTE Journal 102 (1993) Aug., No. 8, Motion Picture Prints—Projectable Image Area.
SMPTE Journal 104 (1995) May, No. 5, Prints Made on Continuous Contact Printers—Exposed Areas for Picture and Audio.

*Primary Examiner*—David M. Gray
*Attorney, Agent, or Firm*—Knobbe, Martens, Olson & Bear, LLP

[57] ABSTRACT

A switchable pulldown film projection system comprising a film transport system for transporting film through a projector. The film transport system has a plurality of sprockets with teeth for engaging perforations on the film, and a pair of motors that rotate the sprockets and move the film in a frame-by-frame manner past an aperture in the projector. The motors are controlled by an electronic controller that changes the rotational output of the motors based on a signal related to the format of the film in terms of the number of perforations spanned by each frame on the film. The controller enables the system to switch between a variety of different film formats, on the same projector and on the same strip of film, without substantially interrupting or delaying operation of the projector.

24 Claims, 3 Drawing Sheets

U.S. PATENT DOCUMENTS

| | | |
|---|---|---|
| 3,819,258 | 6/1974 | Butler et al. . |
| 3,865,738 | 2/1975 | Lente . |
| 4,105,311 | 8/1978 | Boudouris ............... 352/187 |
| 4,120,572 | 10/1978 | Grallert et al. . |
| 4,143,951 | 3/1979 | Suzaki et al. . |
| 4,150,886 | 4/1979 | Merkel et al. . |
| 4,360,254 | 11/1982 | Nyman et al. ............ 352/166 |
| 4,437,742 | 3/1984 | Taniguchi ................ 396/210 |
| 4,678,298 | 7/1987 | Perisic . |
| 4,697,896 | 10/1987 | Fox . |
| 4,702,577 | 10/1987 | Weigert . |
| 4,893,921 | 1/1990 | Beauviala . |
| 4,900,293 | 2/1990 | McLendon . |
| 5,096,286 | 3/1992 | Weisgerber . |
| 5,218,388 | 6/1993 | Purdy . |
| 5,312,304 | 5/1994 | Vetter . |
| 5,341,182 | 8/1994 | Schmidt . |
| 5,506,639 | 4/1996 | Frazen et al. . |
| 5,534,954 | 7/1996 | Vetter . |
| 5,537,147 | 7/1996 | Washino et al. . |
| 5,537,165 | 7/1996 | Miyamori et al. . |
| 5,539,527 | 7/1996 | Kajimoto et al. . |
| 5,543,869 | 8/1996 | Vetter . |
| 5,739,895 | 4/1998 | Vetter . |

SWITCHABLE PULLDOWN FILM PROJECTION SYSTEM

BACKGROUND OF THE INVENTION

The present invention relates to film transport systems for motion picture projectors and, more particularly, to a film projector movement that is capable of transporting film print having frames spanning a predetermined number of perforations per frame and then switching to another film format having frames spanning a different number of perforations per frame, without interrupting the operation of the projector during the switchover.

Conventional 35 mm theatrical motion picture projectors employ a motor driven sprocket wheel which pulls the film intermittently through the film gate at a standard rate of twenty-four frames per second. During the period of film movement, a rotating shutter driven by a constant speed motor blacks out the screen to prevent blurring. The viewing audience is unaware of these moments of darkness due to the phenomenon know as "persistence of vision." Film is supplied to and taken away from the film gate and intermittent sprocket by constant speed sprockets on either side. The periodic movement created at the film gate is smoothed out by film loops on either side of the intermittent sprocket, which are maintained by the constant speed sprockets.

Current theatrical projectors are almost exclusively of the mechanical type. Typically, a single synchronous motor drives a drive shaft bearing multiple drive gears, each of which drives either the shutter or one of the film sprockets at the appropriate speed. The intermittent sprocket is driven by a device called a Geneva mechanism, the purpose of which is to translate one full revolution of the drive shaft into a ninety degree rotation of the intermittent sprocket followed by a stationary period for projection. The ninety degree rotation of a sixteen-tooth sprocket results in a four-perforation frame change (i.e., one "pulldown"). The four-perforation frame standard was established in the late 1800's to accommodate a projected aspect ratio of 1.33:1 and has not changed since that time. Consequently, commercial 35 mm projectors are designed for four-perforation pulldown.

While virtually all theatrical 35 mm projectors are of the mechanical design, there are several specialty projectors on the market which feature electronic pulldown. These designs rely upon a high response servomotor instead of the Geneva device to advance and position the film in the film gate.

In the late 1950's, the "1.85" screen format was developed in order to provide the audience with a "semi-widescreen look" without having to resort to anamorphic camera and projection lenses, used for true widescreen presentation, which optically squeeze a 2.35:1 aspect ratio into a 1.33:1, four-perforation frame. Approximately eighty-five percent of the films currently in release use the 1.85:1 format. To achieve this projected aspect ratio, a mask is simply inserted into the aperture of the projection gate. This mask covers the top and bottom areas of the projection frame, thereby increasing the width to height ratio of the picture. Consequently, the exposed images in these masked areas are never seen.

Figures 1, 2, 3, 4:
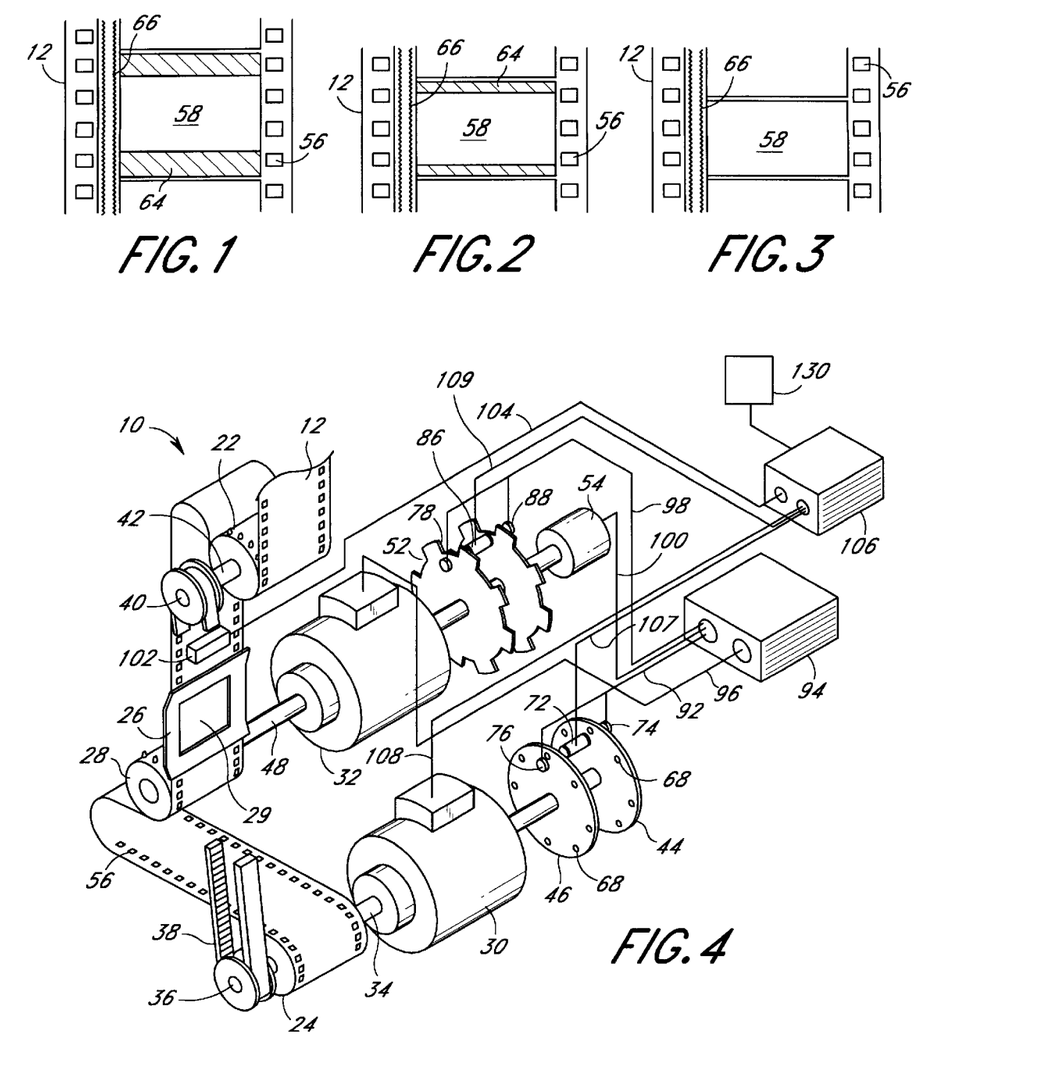
FIG. 1 shows a section of film in one format wherein each frame spans four perforations.
FIG. 2 shows a section of film in another format wherein each frame spans three perforations.
FIG. 3 shows a section of film in still another format wherein each frame spans 2.5 perforations.
FIG. 4 is a perspective view showing the overall components of the film transport system of the present invention, including the control components, with portions of the projector removed for purposes of clarity.

In the accompanying drawings, FIG. 1 shows this quite clearly. The crosshatched area 64 represents the usable film area which is wasted in the 1.85:1 projection format with a frame height of four perforations. The area represented by the reference numeral 66 corresponds to the optical soundtrack. One solution to the problem of wasted film area is to change to an alternate frame height standard which provides the same projectable area as shown in FIG. 1, but without the wasted picture area at the top and bottom. One such alternate frame standard is the three-perforation frame shown in FIG. 2. By eliminating much of the area previously wasted by masking, the same projectable area can be fitted into three perforations of film instead of four. Consequently, elimination of this "wasted" area results in a reduction in release print footage, and therefore cost, by about 25%.

While the three-perforation format is a step in the right direction, it is not the ultimate in film conservation since there is still some wasted area at the top and bottom that must be masked during projection. FIG. 3 illustrates the ultimate frame height for the 1.85:1 format wherein there is virtually no wasted film area. The standard 1.85 format has an established picture width which is limited by the space reserved on the left side of the film for the optical sound track. This limiting frame width, together with the 1.85:1 aspect ratio, establishes the minimum frame height of 0.446 inches. When a few thousandths are added for space between frames, this height corresponds to precisely 2.5 perforations of film length. The 2.5-perforation pulldown format represents a saving of about 37.5% when compared to the standard four-perforation format and is currently being proposed as an alternate industry release print standard.

From the foregoing, it is apparent that there are several alternate frame formats which are highly desirable for various reasons but which suffer from the problem of incompatibility with existing projection systems. The successful introduction of alternate frame format films into theatrical exhibition will require that these facilities be equipped with projectors that are capable of operating in all formats. It is essential that these projection systems retain the capability to project four-perforation format films along with the alternate formats, since anamorphic widescreen presentation requires the full four-perforation frame. Additionally, there will always be some "classic" films and others (e.g., trailers and public service announcements) which remain in the original four-perforation format.

Several designs have been proposed that attempt to provide three/four-perforation format changeability to existing projectors. However, the fundamental problem with these designs is that they require manual changeover of each individual sprocket in the projector when changing the format in either direction. This makes these designs wholly impractical due to time and manpower constraints. The present invention introduces a fully automatic switchable-pulldown film projector movement. This movement will permit the same theatrical projector to exhibit various alternate format films in "back-to-back" fashion without undue attention from technicians and without hesitation in the presentation. In this manner, the present invention satisfies the problems with the prior designs and provides further related advantages.

SUMMARY OF THE INVENTION

The present invention provides a switchable pulldown film projection system comprising a film transport system for transporting film through a projector. The film transport system, also referred to as a film projector movement or "head," includes a plurality of sprockets having teeth for engaging perforations on the film, and a motive element that rotates the sprockets and moves the film in a frame-by-frame manner past an aperture in the projector. In accordance with the invention, a controller is provided to regulate the motive element and thereby maintain or change the rotational speed and position of the sprockets in accordance with the format of the film in terms of the number of perforations spanned by each frame. In this way, the film transport system is capable of running film in a variety of different formats, on the same projector, with a minimum amount of skill required, and without interrupting or delaying the operation of the projector.

In one embodiment of the invention, the film transport system includes a pair of sprockets, one on each side of a film gate, and an intermittent sprocket between the pair for advancing the film frame-by-frame past an aperture in the film gate. The rotational speed of the pair of sprockets is determined by a variable speed motor, and the rotational speed and positioning of the intermittent sprocket is determined by another motor, such as a high-response servomotor. In this embodiment, these two motors comprise the motive element of the system. If desired, however, a single motor or three motors (or more) may be used as the motive element.

The controller, which coordinates the output of the variable speed motor and the servomotor, includes a switch responsive to a trigger signal that indicates the film's format. For example, the trigger signal may be information that is encoded on the film strip and read by a sensor. Based on the type of trigger signal that is received, the switch changes the output of the variable speed motor which, in turn, changes the rotational speed of the pair of sprockets.

The variable speed motor also drives a plurality of synchronizing disks, each of which has a series of apertures that are equally spaced around the circumference of the disk. A separate light source and a photocell straddle each of the synchronizing disks. When in operation, the light source projects a beam of light that registers with the apertures upon rotation of the disks. Each synchronizing disk and its corresponding photocell are designed to control operation of the system in a different film format.

The initial movement of the servomotor for each frame pulldown is controlled by the output of the synchronizing disks. Each time a beam of light passes through an aperture in the selected synchronizing disk, it is sensed by the corresponding photocell. The photocell then generates a pulse which is fed through the controller to the servomotor to initiate an advance of the film by one frame. A series of positioning disks rotated by the servomotor, in combination with another pair of light source/photocell sets for each disk, are designed to feed information to the controller regarding film position to intermittently stop film movement at the appropriate position and assure proper registration of each frame at the film gate. If desired, redundant light source/photocell sets may be provided on each synchronizing disk and positioning disk.

The trigger signal is designed to indicate when the film changes format, such as when there is a change from film having frames spanning four perforations per frame to film having frames spanning three perforations per frame. Of course, the trigger signal can be representative of a change between many different kinds of formats and, in general, is designed to indicate when the film format in the projector changes from a format having frames spanning one predetermined number of perforations to a format having frames spanning another different predetermined number of perforations.

The trigger signal to indicate a change in film format can be generated in a number of ways. In one embodiment, the trigger signal is generated electronically by a sensor coupled to a switch. The sensor may be designed, for example, to read encoded information carried by the film as it enters the projector to indicate a change in the film's format. This information may be encoded on a foil or magnetic strip, an optically read bar code, or by mechanical means. Alternatively, the trigger signal may be generated manually based on a visual inspection of the film by a film operator. Other suitable means of generating this trigger signal will be apparent, and the invention is not limited to manually or electronically generated signals.

Regardless of the manner of signal generation, an important feature of the invention is that the film transport system is adapted to change between film formats without interrupting or otherwise stopping operation of the projector. This eliminates any delays when switching between film formats, for example, so that different film formats may be spliced together on the same strip of film. Moreover, no special skill is required to make the changeover between film formats, as the system is designed to be simple and reliable in operation, without requiring any significant training. Furthermore, the film transport system may be designed to be retrofitted to existing 35 mm projection systems, thereby avoiding the high cost of replacing an entire projection system, including the lamphouse, condenser, platter systems and other components.

Other features and advantages of the present invention will become apparent from the following description of the invention, taken in conjunction with the accompanying drawings, which illustrate, by way of example, the principles of the invention.

BRIEF DESCRIPTION OF THE DRAWINGS

The accompanying drawings illustrate the invention. In such drawings.

DESCRIPTION OF THE PREFERRED EMBODIMENT

The present invention is embodied in a film transport system, generally referred to by the reference numeral 10, for transporting film 12 through a projector. As shown in FIG. 4, the film transport system 10 includes two constant-speed sprockets, comprising a feed sprocket 22 and a holdback sprocket 24, located on opposite sides of a film gate 26. An intermittent sprocket 28 is located immediately below the film gate 26 and between the constant speed sprockets 22 and 24 to advance the film 12 intermittently, frame-by-frame, through the film gate in the usual manner. Thus, the intermittent sprocket 28 precisely registers each frame of the film 12 with the film gate 26 at the U.S. standard rate of twenty-four frames per second. The film gate 26 also includes an aperture 29 and a light source (not shown) for film projection. Slack in the film 12, in the form of loops of loose film, is provided between the feed sprocket 22 and the film gate 26 and between the intermittent sprocket 28 and the hold-back sprocket 24 to prevent film breakage.

The film transport system 10 also includes a motive element comprising a variable speed motor 30 and a servomotor 32. The variable speed motor 30 in this embodiment is a two-speed motor, such as a crystal controlled motor. However, as explained below, the variable speed motor 30 can be a three-speed motor, or it may provide additional speeds as desired. The servomotor 32 preferably is a high-response servomotor. Alternatively, it is contemplated that the motive element may comprise a single motor with mechanical or other means to drive and change the speed and position of the sprockets 22, 24 and 28.

The variable speed motor 30 rotates an output shaft 34 extending from each end of the motor. One end of the shaft 34 is connected for rotation to the hold-back sprocket 24. The shaft 34 also rotates a drive wheel 36 which carries a timing belt 38 that couples the drive wheel 36 to a second wheel 40. The second wheel 40 is connected to a shaft 42 that rotates the feed sprocket 22. Thus, the feed sprocket 22 and the hold-back sprocket 24 are coupled together by the timing belt 38 and are rotated in unison at a constant speed by the variable speed motor 30.

The shaft 34 on the variable speed motor 30 also carries a plurality of synchronizing disks. In this embodiment, there are two such synchronizing disks 44 and 46. Thus, the feed sprocket 22, the hold-back sprocket 24 and the synchronizing disks 44 and 46, which are all commonly coupled to the shaft 34 of the variable speed motor 30, are rotated at the same rotational speed.

The servomotor 32 also rotates an output shaft 48 extending from each end of the servomotor. One end of the shaft 48 is connected for rotation to the intermittent sprocket 28, and the other end of the shaft 48 carries a plurality of positioning disks. In this embodiment of the invention, there are two positioning disks 50 and 52. The servomotor 32 also rotates a velocity tachometer 54 at the outermost end of the shaft 48.

Figure 5:
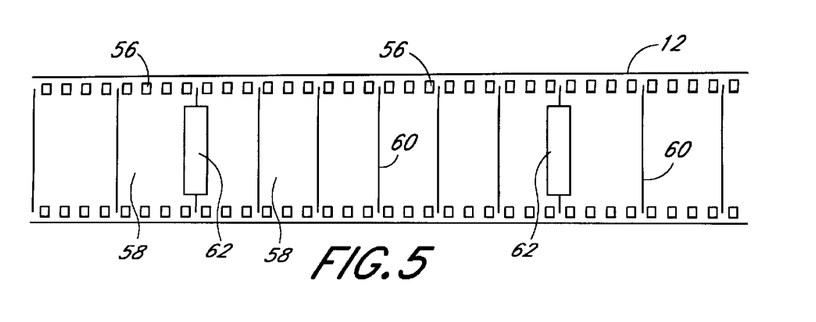
FIG. 5 shows a strip of film having multiple formats suitable for use in the film transport system.

FIG. 5 shows a section of film 12 having a plurality of perforations 56 along the edges of the film. Between the perforations 56 are frames 58 which, for purposes of illustration, are separated by vertical lines 60. The section of film 12, which is standard 35 mm film, is shown as having different formats across its length. The left and right sections of the film 12 have a format in which each frame 58 spans four perforations 56. The center section of the film 12 has a format in which each frame 58 spans three perforations 56. The transition between these two formats is represented by a trigger strip 62, the function of which will be explained in more detail below. FIGS. 1 and 2, previously discussed, show the two film formats in greater detail.

Figure 6:
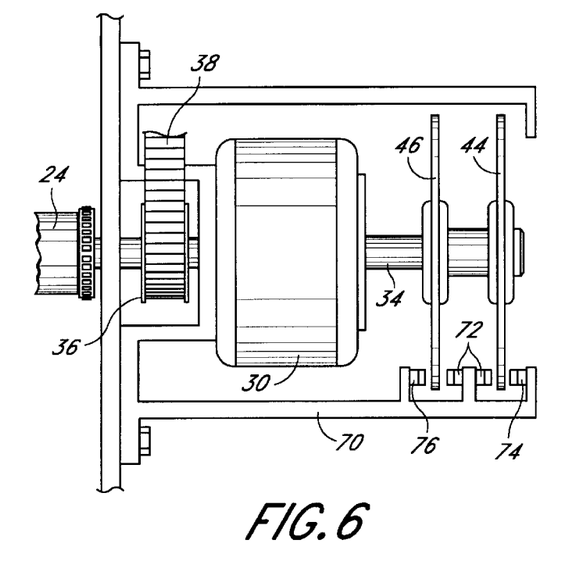
FIG. 6 is an elevational view of a hold-back sprocket and a plurality of synchronizing disks, both of which are driven by a variable speed motor.
Figure 7:
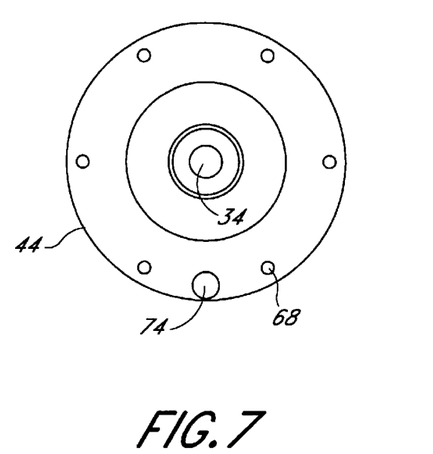
FIG. 7 is an elevational view of one of the synchronizing disks of FIG. 6.

FIGS. 6 and 7 show the synchronizing disks 44 and 46 in more detail. Each synchronizing disk 44 and 46 has a plurality of apertures 68 that are equally spaced around the circumference of the disk. The first synchronizing disk 44 located outwardly on the shaft 34 from the second synchronizing disk 46 has six equally spaced apertures 68, and the second synchronizing disk 46 at the innermost end of the shaft 34 has eight apertures 68.

A bracket 70 mounted adjacent to the synchronizing disks 44 and 46 carries a light source 72 that projects a beam of light toward each synchronizing disk. The beam of light registers with the apertures 68 in each synchronizing disk 44 and 46, such that a beam of light passes through each aperture when the synchronizing disks are rotated. A pair of photocells 74 and 76 are carried by the bracket, with one photocell located on opposite sides of the synchronizing disks 44 and 46 from the light source 72. Thus, when the light source 72 is operated, one of the photocells 74 or 76 selected for operation receives the beam of light each time one of the apertures 68 passes between the light source and the selected photocell.

Figure 8:
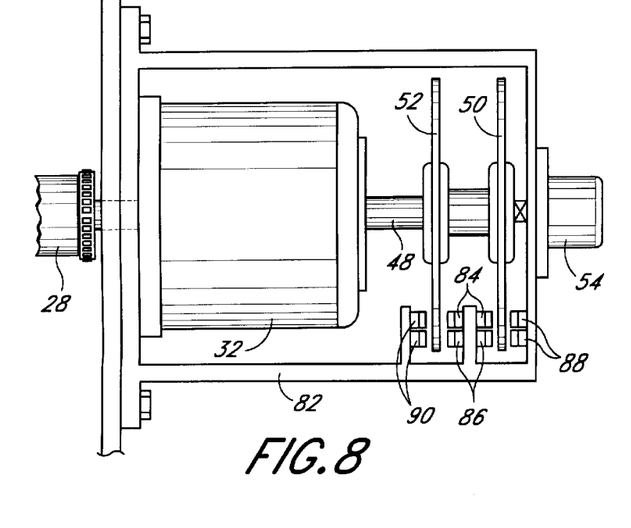
FIG. 8 is an elevational view of a servomotor that drives an intermittent sprocket and a plurality of positioning disks.
Figure 9:
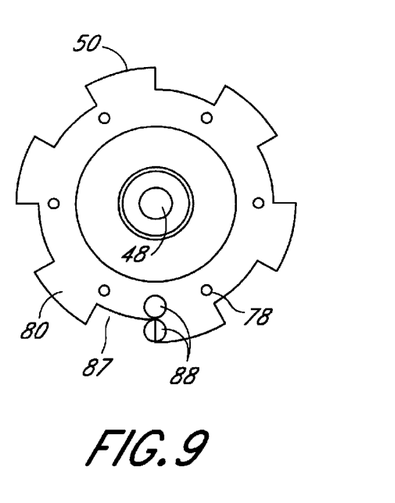
FIG. 9 is an elevational view of one of the positioning disks of FIG. 8.

FIGS. 8 and 9 show the details of the positioning disks 50 and 52. Like the synchronizing disks 44 and 46, each positioning disk 50 and 52 has a plurality of apertures 78 that are equally spaced around the circumference of the disk. The first positioning disk 50 located outwardly on the shaft 48 from the second positioning disk 52 has six equally spaced apertures 78, and the second positioning disk 52 at the innermost end of the shaft 48 has eight apertures 78. The circumferential edge of each positioning disk 50 and 52 also is provided with a number of equally spaced vanes 80. Thus, the first positioning disk 50 has six vanes 80, and the second positioning disk 52 has eight vanes 80.

A bracket 82 mounted adjacent to the positioning disks 50 and 52 carries two light sources 84 and 86, one mounted inside the other, that project beams of light toward each positioning disk 50 and 52. The innermost light source 84 projects a beam of light that registers with the apertures 78 in each positioning disk 50 and 52, such that a beam of light passes through each aperture when the positioning disks are rotated. Similarly, the outermost light source 86 projects a beam of light that passes to the other side of each positioning disk 50 and 52 through spaces 87 between each vane 80.

Two photocells sets 88 and 90 also are located on opposite sides of the positioning disks 50 and 52, respectively, in registration with the two light sources 84 and 86. Thus, when the light sources 84 and 86 are operated, a corresponding pair of photocells sets 88 or 90 are selected for operation to receive the beams of light that pass through the apertures 78 and spaces 87 between the vanes 80.

The operation of the film transport system 10 is described below and is best understood with reference to FIG. 4. For purposes of this description, it will be assumed that the film transport system 10 is initially set for operation with a film format in which each frame spans four perforations, followed by subsequent switching to a film format in which each frame spans three perforations, such as when these two film formats are spliced together on the same film strip. For convenience, these two film formats are referred to below as the "four-perforation format" and the "three-perforation format," respectively.

At the outset, the variable speed motor 30 is energized and commanded to rotate its output shaft 34 at the appropriate rotational speed corresponding to 35 mm film having the four-perforation format. This results in rotation of the feed sprocket 22 and the hold-back sprocket 24 in the film advance direction, thereby supplying and taking up equal amounts of film 12 on opposite sides of the film gate 26 and the intermittent sprocket 28. At the same time, the variable speed motor 30 also rotates the synchronizing disks 44 and 46.

The light source 72 emits a beam of light toward each of the synchronizing disks 44 and 46 but, since the system 10 is operating in the four-perforation format, only the photocell 74 for the first synchronizing disk 44 is activated. For each beam of light that is received through one of the apertures 68 by the photocell 74, a corresponding pulse 92 is emitted from the photocell 74. Since there are six apertures 68 in the first synchronizing disk 44, there are six pulses 92 generated for each revolution of the disk.

The pulses 92 emitted from the activated photocell 74 for the first synchronizing disk 44 are applied to an electronic controller 94 that controls the operation of the servomotor 32, which also has been energized. The intermittent sprocket 28 is driven by signals 96 sent to the servomotor 32 from the controller 94. These signals 96 are generated by the controller 94 based on the pulses 92 that are received from the photocell 74 and initiated by the first synchronizing disk 44. Thus, the signals 96 initiate rotation of the intermittent sprocket 28.

As the intermittent sprocket 28 is driven, the film 12 is advanced through the film gate 26 at the rate of one frame for each output pulse 92 of the photocell 74. Thus, there are six "pulldowns" of film frame for every revolution of the first synchronizing disk 44, which corresponds to one revolution of the twenty-four tooth intermittent sprocket 28 in six steps of four teeth each step, which is proper for the four perforation format. During this operation, the electronic controller 94 ensures that each film frame is positioned precisely in the film gate 26. This is accomplished in the following manner.

As the intermittent sprocket 28 advances the film frame 58 into position in the film gate 26, the first positioning disk 50 is sensing the position of the intermittent sprocket, and likewise the position of the film frame, by means of the apertures 78 and vanes 80 which permit beams of light from the light sources 84 and 86 to be received by the corresponding photocell set 88 for the first positioning disk 50. Simultaneously, the velocity tachometer 54 mounted at the outermost end of the shaft 48 of the servomotor 32 is sensing the rotational speed of the intermittent sprocket 28. Through a system of feedback signals 98 and 100, this information is being continuously monitored by the electronic controller 94, where it is used to shape the voltage waveform in accordance with the need to accelerate, decelerate or stop the servomotor 32. In this manner, the film frame 58 is rapidly moved into the film gate 26 and positioned with the greatest accuracy. Such a feedback system is described in U.S. Pat. No. 3,819,258, which is incorporated herein by reference.

As the film 12 continues to advance through the system 10, one of the trigger strips 62 on the film will be read by a sensor 102 ahead of the film gate 26. In one embodiment, the trigger strip 62 carries information that is magnetically, optically or otherwise encoded onto the strip 62. Ideally, the trigger strip 62 is located at the splice between the two film formats. The information read by the sensor 102 in this case, by way of example, indicates a change of film format from the four perforation format to the three perforation format and an appropriate pulse 104 is generated by the sensor 102 corresponding to this change in format. This pulse 104 is amplified in an amplifier (not shown) where it is received by switching electronics 106 comprising part of the overall film transport control. The switching electronics 106 also activate the light sources 72, 84 and 86 via signals 107 and 109).

The pulse 104 from the sensor 102 causes the switching electronics 106 to send a signal 108 to the variable speed motor 30 to adjust its speed for operation in the three-perforation format. During this changeover, the photocell 76 for the second synchronizing disk 46 is activated, and the previously activated photocell 74 for the first synchronizing disk 44 is deactivated. As a result, the photocell 76 for the second synchronizing disk 46 will now receive eight beams of light for every revolution of the second synchronizing disk, thereby generating a corresponding number of pulses 92 that are sent to the electronic controller 94.

It is noted that one revolution of the second synchronizing disk 46 corresponds to one revolution of the twenty-four tooth intermittent sprocket 28. Since each pulse 92 generated by the photocell 76 of the second synchronizing disk 46 is sent to the servomotor 32 via the electronic controller 94 and results in one rotational advancement of the intermittent sprocket 28, and thus one frame pulldown, there are now eight pulldowns of three sprocket teeth each for every revolution of the second synchronizing disk 46, which is proper for the three perforation format.

In the three perforation format, shown in FIG. 2, the frame's center line, from left to right, passes through the center of a film perforation 56. In the four perforation format, shown in FIG. 1, however, the frame center line bisects the space between two film perforations 56—a difference of one half of a perforation between the two formats. Consequently, the first center-to-center step between a four-perforation format and a three-perforation format is a step of 3.5 perforations. Thereafter, the center-to-center spacing will be a constant three perforations per frame. The film transport system 10 is designed to accommodate this offset by an initial repositioning of the intermittent sprocket 28. This can be accomplished by orienting the second positioning disk 52 (with eight apertures 78 and vanes 80 corresponding to operation in the three-perforation format) such that it lags the first positioning disk 50 (with six apertures 78 and vanes 80 corresponding to operation in the four-perforation format) by 7.5 degrees, which is the equivalent of one-half of a perforation on a twenty-four tooth sprocket. In this manner, the frame-to-frame spacing remains at three perforations while the intermittent sprocket 28 is reoriented to maintain proper picture framing in the three-perforation format.

The transfer of control from the first synchronizing disk 44 to the second synchronizing disk 46 takes place during the intermittent sprocket rest period. However, since the leading edge of the vane 80 and the aperture 78 on the second positioning disk 52 are oriented to lag the first positioning disk 50 by one-half perforation, upon first movement following a rest period the second positioning disk 52 will rotate only 7.5 degrees (½ perforation) before the vane and the aperture cause pulses 98 to be emitted from the newly activated photocells 90. The electronic controller 94 must be programed to ignore these initial changeover pulses and wait for the following set of pulses so that the film 12 will make the full initial advance of 3.5 perforations.

Since the sensor 102 must be positioned ahead of the film gate 26, the passage of the trigger strip 62 over the sensor will generate a pulse 104 slightly before the film 12 is in the proper position for a changeover. Consequently, the switching electronics 106 must provide for a delay in the process. The period of the delay will be determined by the distance between the sensor 102 and the film gate 26, a constant, and the current mode of operation of the system 10, as determined from the encoded information on the trigger strip 62. Because the film 12 is moving slower in the three-perforation format, the delay period will be slightly longer. An alternative means for compensating for the offset position of the sensor 102 would be to offset the trigger strip placement (i.e., lagging) on the film print by an amount equal to the sensor offset from the film gate.

At such time as another trigger strip 62 on the film 12 is read by the sensor 102, another pulse 104 will be sent to the switching electronics 106, which will signal all components of the system 10 to return to the operation condition corresponding to the four-perforation format, as described above.

From the foregoing, it will be appreciated that the film transport system 10 of the present invention can switch back and forth between different film formats on the same strip of film 12, without interrupting or halting operation of the projector 14. This is a huge advantage for film producers, distributors, projectionists and exhibitors, who now have greater options in bringing two (or more) different film formats together on the same strip of film. The expense and effort in film distribution and exhibition, is thus greatly reduced. Moreover, for projection purposes, little skill or training is required to implement the changeover between film formats, thus making the system ideal for operation by relatively unskilled movie theater employees.

The switchable pulldown projection system will allow distributors to manufacture release prints in alternate formats which eliminate waste. In doing so they will save materials and money with no concurrent reduction in the quality of the image shown to consumers. And the benefits of this process go well beyond those initial savings. Because the waste is eliminated, the prints are physically shorter and lighter. Therefore they cost less to ship and may even be shipped fully platter-mounted and ready for projection.

Presently, a 100 minute film is 9,000 feet long and, owing to the weight, is shipped in 2000 foot reels. These reels must be joined together on the specific projector for the screen they are to be shown on. This process is called "mounting" the show. It must be done by a skilled individual such as a projectionist. When the theater management decides to move that print to another screen, it must usually be "broken down" and "remounted" again, as it is too heavy to easily move from projector to projector on a platter. However, in the new more-compact form made possible by the present invention, that same 100 minutes will be only 6,750 feet long (using film having a three-perforation format) or 5,625 feet (using film having a 2.5-perforation format). At this reduced length and weight, it will be possible to ship films in a single pre-mounted reel and move that reel from projector to projector without "breaking-down" and "remounting" the show.

Of course, it will be understood that when a new reel of film 12 having a constant format is first loaded into the projector, the trigger strip 62 may be placed at the beginning of the film strip or a manual switch 130 must be activated to command the appropriate operation of the projector. Thus, upon reading the trigger strip 62 or upon activation of a manual switch 130, the switching electronics 106 can make the necessary adjustments, described above, to operate the film transport system 10 in the appropriate manner for the particular format of the film 12 being run through the projector.

It will also be appreciated that the film transport system 10 is capable of switching, not only between the two film formats described above, but between any other number of film formats. Thus, by way of further example, the film transport system 10 may be configured to use the film format shown in FIG. 3, which illustrates a section of film 12 in which each frame 58 spans 2.5 perforation. To be able to switch from either one of the previously mentioned film formats to the latter format of 2.5 perforations per frame, requires changing the number of apertures 68 associated with the synchronizing disks 44 and 46 and the number of apertures 78 and vanes 80 in the positioning disks 50 and 52. Alternatively, if it is desired to switch between all three film formats, three synchronizing disks 44, 46 and 110 and three positioning disks 50, 52 and 112 may be provided, as shown in FIGS. 10a–10d. The changeover among the three formats requires the variable speed motor 30 to be operable in three different speeds. It also requires that the number of teeth on the intermittent sprocket be changed to a number which is evenly divisible by 2.5, 3.0 and 4.0 which in this case is sixty teeth.

Thus, the first synchronizing disk 44, corresponding to operation in the four-perforation format, now has fifteen equally-spaced apertures 68. The second synchronizing disk 46, corresponding to operation in the three-perforation format, now has twenty apertures 68. A third synchronizing disk 110, corresponding to operation in the 2.5-perforation format, has been added. This third synchronizing disk 110 has twenty-four apertures 68 and a corresponding light source 114 and photocell 116 to generate the required pulses that govern operation of the servomotor 32. A corresponding number of apertures 78 and vanes 80 are provided in each of the first and second positioning disks 50 and 52, as well as a third positioning disk 112 that has been added corresponding to the 2.5-perforation format. The third positioning disk 112 also has its own light source 118 and photocell set 120.

It will be appreciated from the foregoing that different or additional film formats may be run on the film transport system 10 by appropriate re-configuring of the apertures, spaces and vanes associated with the synchronizing and positioning disks. Therefore, while not all of the synchronizing disks and positioning disks are shown in an elevational view, it will be apparent to those of skill in the art from the foregoing description, in conjunction with FIGS. 7, 9, 10b and 10d, how to configure the apertures, spaces and vanes to accommodate different or additional film formats on the film transport system 10, as desired.

Figure 10A:
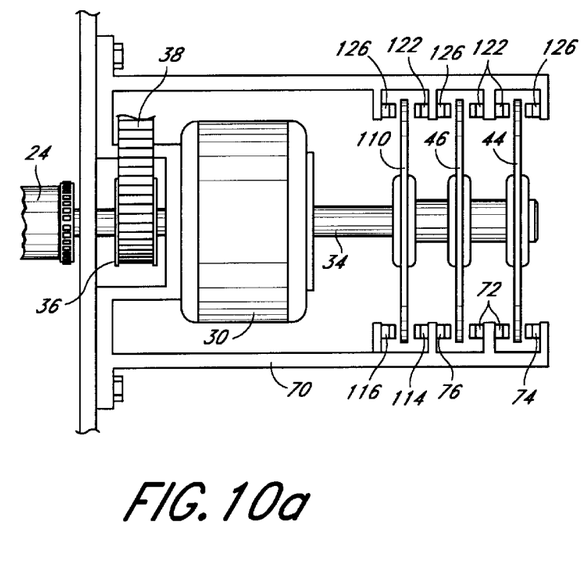
FIGS. 10a–10d illustrate a further embodiment of the invention, similar to the embodiment of FIGS. 6–9, and show an additional synchronizing disk and positioning disk to accommodate operation of the system in additional film formats.
Figure 10B:
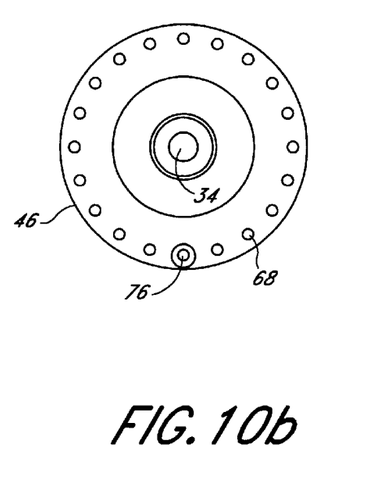
Figure 10C:
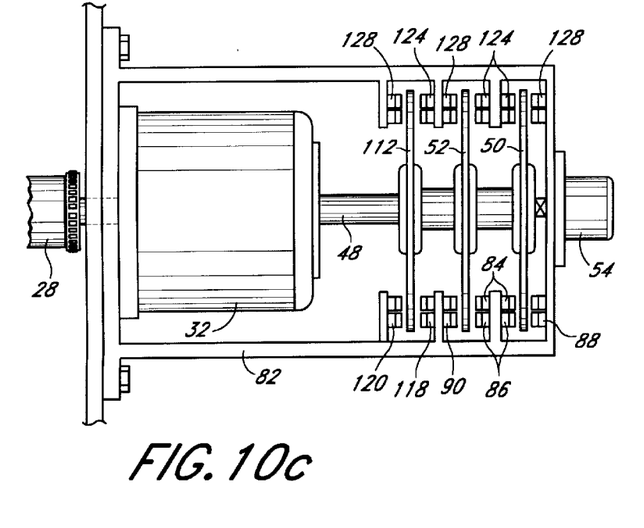
Figure 10D:
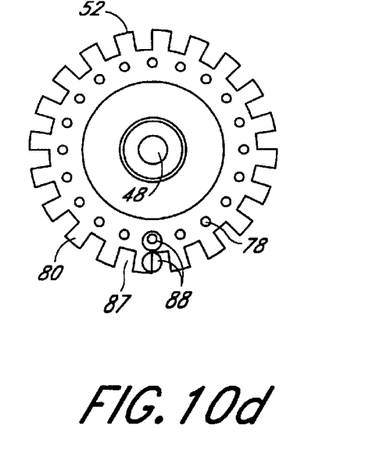

In addition, redundant sets of light sources 122 and 124 and photocells 126 and 128 may be provided for each of the synchronizing disks 44, 46 and 110 and positioning disks 50, 52 and 112. These redundant sets of light sources 122 and 124 and photocells 126 and 128 are illustrated in FIGS. 10a and 10c. This redundancy helps ensure trouble free operation in the event of a malfunction of one of the sets of light sources 72, 84 or 86 or photocells 74, 76, 88 or 90. This redundancy may be provided in embodiment shown in FIG. 4 as well.

When the film transport system 10 is switching from the four-perforation format to the 2.5-perforation format, an initial step of 3.25 perforations will be required. This is accomplished by positioning the third synchronizing disk 110 such that it lags the first synchronizing disk 44 by 4.5 degrees. In this manner, the first step will advance the intermittent sprocket 28 by an additional 0.75 perforations beyond the 2.5 perforations being commanded by the electronic controller 94.

As previously discussed for the switchover from four-perforation to three-perforation operation, the 4.5 degree offset of the second positioning disk 52 will cause premature pulses 98 to be emitted from the newly activated photocells 90 upon changeover. The electronic controller 94 must be programed to ignore these pulses and wait for the next pair of pulses.

Similarly, the changeover from the three-perforation format to the 2.5-perforation format will require a step of 2.75 perforations. However, this is automatically accounted for by the existing one-half perforation offset between the second synchronizing disk 46 and the first synchronizing disk 44.

While FIG. 4 shows a separate sensor 102 at the film gate 26, it will be appreciated that the system 10 can use sensors already incorporated into existing projectors. Such sensors already are commonly used to dim house lights, open curtains and carry out other functions. It is also contemplated that the trigger strip 62 may be a foil strip which cannot be demagnetized, an optically read bar code, a mechanical trigger (e.g., notching, punching or embossing the film) or other appropriate means. Also, if desired, the sensor 102 can be replaced by a manual switch 130 on the projector 14 to initiate a format changeover based on a visual inspection of the film 12 by a film operator.

A further advantage of the film transport system 10 of the present invention resides in its ability to automatically rewind an entire platter system, which supplies and takes-up film to and from the film transport system 10. In prior platter systems, the projectionist is required to re-thread the system between showings of each complete mounted platter. Moreover, conventional film transport systems employ mechanical devices that prevent the execution of high-speed film rewind. The film transport system 10 of the present invention, however, eliminates these mechanical devices and utilizes a fully electronic design that avoids intermittent movement at the intermittent sprocket 28 during the rewind operation and, therefore, provides a smooth, high speed film movement in reverse. The film transport system 10 can be commanded to operate in the high-speed rewind mode by providing a trigger strip 62 at the end of the film 12 which, by the process described above, commands the motors 30 and 32 to rewind the film at high speed.

While a particular form of the invention has been illustrated and described, it will be apparent that various modifications can be made without departing from the spirit and scope of the invention. Accordingly, it is not intended that the invention be limited, except as by the appended claims.

We claim:

1. A film projector movement for transporting film through a motion picture projector, wherein the film has a series of frames and a plurality of perforations along edges of the film, comprising:

an intermittent sprocket having teeth for engaging the perforations and for advancing and registering the film frame-by-frame with respect to an aperture in the projector;

at least one sprocket having teeth for engaging the perforations and for maintaining loops of film on opposite sides of the aperture and intermittent sprocket;

a first motor having an output coupled to said one sprocket, wherein the output of the first motor is variable and adapted to selectively rotate said one sprocket at a plurality of different constant rotational speeds;

a second motor having an output coupled to the intermittent sprocket, wherein the output of the second motor is adapted to intermittently rotate the intermittent sprocket and thereby advance and register the film frame-by-frame with respect to the aperture in the projector;

a controller that controls the outputs of the first and second motors and which is adapted to change the rotational speed of said one sprocket and the intermittent rotational movement of the intermittent sprocket when there is a change in the format of the film in terms of the number of perforations spanned by each frame on the film, and wherein the frames of the film are recentered with respect to the aperture each time there is a change in the film format.

2. The film projector movement of claim 1, further comprising a constant speed sprocket on each side of the aperture.

3. The film projector movement of claim 1, wherein the first motor comprises a variable speed motor, and the second motor comprises a servomotor.

4. The film projector movement of claim 1, wherein the controller is responsive to a trigger signal for changing the outputs of the first and second motors and thus the rotational speed of said one sprocket and the intermittent rotational movement of the intermittent sprocket, wherein the trigger signal indicates when the film in the projector changes from a format in which each frame spans a first predetermine number of perforation on the film to a format in which each frame spans a second predetermined number of perforations on the film.

5. The film projector movement of claim 4, wherein the trigger signal is produced based on information carried by the film to indicate when the film in the projector changes format.

6. The film projector movement of claim 4, wherein the trigger signal is generated automatically during operation of the projector by electronic, magnetic, optical, or mechanical means.

7. The film projector movement of claim 4, wherein the trigger signal is generated manually.

8. In a motion picture film projector, a film projector movement for transporting film having a series of frames with images thereon, and a plurality of perforations along edges of the film, comprising:

an intermittent sprocket having teeth for engaging the perforations and for advancing the film frame-by-frame past an aperture in the projector;

a pair of sprockets, one on each side of the aperture and the intermittent sprocket, having teeth for engaging the perforations and for moving the film through the projector in cooperation with the intermittent sprocket;

a first motor having a rotational output adapted to selectively rotate the pair of sprockets at a plurality of different constant speeds;

a second motor having a rotational output adapted to intermittently rotate the intermittent sprocket; and a controller that controls and coordinates the rotational outputs of the first and second motors, wherein the controller is adapted to change the rotational output of the first and second motors, without substantially interrupting projector operation, to thereby change the rotational speed of the pair of sprockets and the intermittent rotational movement of the intermittent sprocket when the film in the projector changes from a first film format in which each frame spans a first predetermined number of perforations on the film to a second film format in which each frame spans a second predetermined number of perforations on the film, and wherein the frames of the film are recentered with respect to the aperture each time there is a change in the film format.

9. The film projector movement of claim 8, wherein the controller is controlled by information indicating when the film in the projector changes from the first film format to the second film format.

10. The film projector movement of claim 9, wherein the film carries information that is sensed by a sensor to indicate when the film format in the projector changes.

11. The film projector movement of claim 9, wherein the controller controls the rotational output of the first motor based on a trigger signal generated by the sensor.

12. The film projector movement of claim 11, wherein the trigger signal is based on the film format.

13. A film projector movement for transporting film through a projector, wherein the film has perforations along its edges and frames between the perforations, comprising:

a plurality of sprockets that engage the film and move it through the projector;

a motive element having a first output coupled to one of said sprockets for selectively rotating said sprocket at a plurality of different rotational speeds and a second output for intermittently rotating another of said sprockets and registering the film frame-by-frame with respect to an aperture in the projector; and a controller coupled to the motive element for controlling the motive element, wherein the controller is responsive to a trigger signal for changing the outputs of the motive element and thus the rotational movement of the sprockets, wherein the trigger signal indicates when the film in the projector changes from a format in which each frame spans a first predetermined number of perforations on the film to a format in which each frame spans a second predetermined number of perforations on the film, and wherein the frames of the film are recentered with respect to the aperture each time there is a change in the film format.

14. A method of transporting film through a projector having a motive element that rotates a plurality of sprockets adapted to intermittently register the film frame-by-frame with respect to an aperture in the projector, comprised of determining the film format in terms of the number of perforations spanned by each frame on the film, generating a trigger signal during operation of the projector based on the film format that controls the output of the motive element and the rotational movement of the sprockets, using the trigger signal to control the motive element to either maintain or change the rotational movement of the sprockets based on the film format, and recentering the frames of the film with respect to the aperture each time there is a change in the film format.

15. A method of transporting film through a projector having an intermittent sprocket and a pair of sprockets that engage perforations on the film and advance and register the film frame-by-frame with respect to an aperture in the projector, wherein a first motor has a rotational output that selectively rotates the pair of sprockets at a plurality of different constant rotational speeds and a second motor has a rotational output that rotates and positions the intermittent sprocket, comprised of:

determining the film format in terms of the number of perforations spanned by each frame on the film;

controlling the rotational output of the first motor and the rotational speed of the pair of sprockets based on the film format;

controlling the rotational output of the second motor and the positioning of the intermittent sprocket based on the film format;

generating a trigger signal that changes the rotational outputs of the first and second motors and thus the rotational speed of the pair of sprockets and the positioning of the intermittent sprocket, wherein the trigger signal is based on a change in the film format; and recentering the frames of the film with respect to the aperture each time there is a change in the film format.

16. The method of claim 15, further comprised of encoding information onto the film that identifies the film format, and then sensing that information to generate the trigger signal.

17. The method of claim 16, further comprised of sending the trigger signal to a controller that, based on the trigger signal, controls the rotational outputs of the first and second motors.

18. The method of claim 16, further comprised of providing a plurality of trigger strips on the film at locations corresponding to a change in the film format, encoding information onto the trigger strips that identifies the changed film format, and sensing that information to generate the trigger signal.

19. A film projector movement for transporting film through a motion picture projector, wherein the film has a series of frames and plurality of perforations along edges of the film, comprising:

a plurality of sprockets that engage the film and move it through the projector;

a motive element having an output coupled to the sprockets for rotating the sprockets and advancing and registering the film frame-by-frame with respect to an aperture in the projector;

a controller coupled to the motive element for controlling and coordinating the output of the motive element; and wherein the controller is responsive to a signal generated automatically during operation of the projector that commands the controller to change the output of the motive element when the film in the projector changes from a first format in which each frame spans a first predetermined number of perforations to a second format in which each frame spans a second predetermined number of perforations, and wherein the frames of the film are recentered with respect to the aperture each time there is a change in the film format.

20. The film projector movement of claim 18, further comprising a sensor coupled to the controller, wherein the sensor generates the signal.

21. The film projector movement of claim 20, wherein the sensor reads information carried by the film indicating when the film in the projector changes from the first format to the second format.

22. A method of transporting film through a projector having a plurality of sprockets that engage perforations on the film and a motive element that has an output that rotates the sprockets and registers the film frame-by-frame with respect to an aperture in the projector, comprised of:

determining a first format of the film in which the film has frames spanning a first predetermined number of perforations on the film;

controlling the output of the motive element based on the first format to register and properly center the frames with respect to the aperture;

sensing a change in film format during operation of the projector from the first format to a second format in which the film has frames spanning a second predetermined number of perforation on the film; and changing the output of the motive element based on the second format to register and properly center the frames with respect to the aperture.

23. The method of claim 22, further comprised of:

splicing sections of film together comprised of the first format and the second format to form a single film strip;

applying information on the film strip adjacent to each splice that indicates the film format following each such splice;

sensing the information on the film during operation of the projector to generate a signal that is indicative of the film format; and controlling the output of the motive element based on the signal to register and properly center the frames of the film in said film format with respect to the aperture.

24. A film projector movement for transporting film through a motion picture projector, wherein the film has a series of frames and plurality of perforations along edges of the film, comprising:

a plurality of sprockets that engage the film;

an intermittent sprocket that engages the film;

a motive element having a first output coupled to the plurality of sprockets for rotating the sprockets and controlling loops of film on opposite sides of an aperture in the projector, and having a second output coupled to the intermittent sprocket for registering the film frame-by-frame with respect to the aperture;

a controller coupled to the motive element for controlling and coordinating the first and second outputs of the motive elements; wherein the controller is responsive to a signal generated automatically during operation of the projector that commands the controller to change the outputs of the motive element when the film in the projector changes from a first format in which each frame spans a first predetermined number of perforations to a second format in which each frame spans a second predetermined number of perforations; and recentering means for recentering the frames of the second format with respect to the aperture when the film in the projector changes from the first format to the second format.

* * * * *